3,508,894
Patented Apr. 28, 1970

3,508,894
METHOD FOR METALIZING A GLASS SURFACE
Julius Joseph Torok, Toledo, Ohio, assignor to Owens-Illinois, Inc., a corporation of Ohio
No Drawing. Filed Sept. 29, 1966, Ser. No. 583,100
Int. Cl. C03c 21/00
U.S. Cl. 65—30                                         13 Claims

ABSTRACT OF THE DISCLOSURE

A glass surface is metalized by means of an in situ surface conversion of certain metal oxide glass forming constituents from an oxidized state to a reduced elemental metallic state. The conversion is effected by providing a glass, which on a mole percent theoretical oxide basis is composed essentially of the following range of indicated constituents:

| Constituents: | Mole percent |
|---|---|
| $SiO_2$ | 50–94 |
| $Al_2O_3$ | 0.5–30 |
| $Cu_2O$ | 1.5–35 |
| $TiO_2$ | 0–11 |
| $Fe_2O_3$ | 0–6 |
| NiO | 0–6 |
| CoO | 0–6 |
| $AlF_3$ | 0–6 | and by disposing the glass surface, while the latter is at a temperature of about 750–950° C., in a room temperature oil bath of animal, mineral or vegetable oil to thereby effect a liberation of hydrogen from the oil bath and a consequent hydrogen surface reduction of the metal oxide glass forming constituents and converts the latter to a reduced elemental metallic state.

---

The present invention relates generally to the field of glass surfaces, and more particularly, to a process for producing a metallic surface on glass substrates. Specifically, the instant invention pertains to a method for producing a metal layer on glass by heating and treating the glass with an oil.

A critical need exists for an economical, easy and effective method for fabricating a metallic layer on and in the surface of glass substrates. Coupled with the requirement for effective fabrication, it is desirable that the metal ions forming the metal layer constitute an integral and essential part of the glass and remain tightly bound with the glass to provide a metalized or electrically conductive surface.

Accordingly, it is an object of the present invention to provide a novel means for producing a metal layer on glass surfaces.

Another object of the present invention is to provide a means for producing a metal surface on glass bodies wherein said metal is an integral part of said glass.

Still another object of the present invention is to provide an effective method for converting the metallic oxides in glasses to their corresponding metal.

Yet a still further object of this invention is to provide a unique means for effecting conductive surfaces on glass substrates.

Yet another object of the invention is to provide a metallic layer without contamination by foreign and harmful substances to the electrical properties of the glass, for example metallic ions such as sodium, which might be inserted into the glass as in other manufacturing processes such as electroplating.

These and other objects, features and advantages of this invention will become self-evident from the following detailed description of the mode and manner of practicing the invention.

In attaining the novel objects and features of the present invention, it has now been surprisingly found that a metallic surface can be made on a glass substrate by the novel process of first heating the glass body and then dipping the heated glass into an oil.

Generally, the glass to be metalized, as employed in the present inventive process, is a self-containing glass, that is, the glass itself acts as a source for the metal so that the metal produced on the surface of the glass is an integral part of the glass and remains tightly bound with the glass. Exemplary of glasses employed for the purpose of the present invention are glass compositions containing copper and other glass forming components such as $SiO_2$, $Al_2O_3$, $Fe_2O_3$, $TiO_2$, NiO, CoO and $F_2$. The glasses generally consist of 50 to 94 mole percent $SiO_2$, 0.5 to 30 mole percent $Al_2O_3$ and 1.5 to 35 mole percent $Cu_2O$; a glass containing 50 to 94 mole percent $SiO_2$, 0.5 to 30 mole percent $Al_2O_3$, 1.5 to 35 mole percent $Cu_2O$, 0 to 11 mole percent $TiO_2$, 0 to 6 mole percent $Fe_2O_3$, 0 to 6 mole percent NiO, 0 to 6 mole percent CoO and 0 to 6 mole percent $AlF_3$; a glass containing 58 to 83 mole percent $SiO_2$, 4 to 20 mole percent $Al_2O_3$, 10 to 20 mole percent $Cu_2O$, 0 to 11 mole percent $TiO_2$, 0 to 6 mole percent $Fe_2O_3$, 0 to 6 mole percent NiO, 0 to 6 mole percent CoO and 0 to 6 mole percent $AlF_3$; and a glass containing 58 to 83 mole percent $SiO_2$, 4 to 20 mole percent $Al_2O_3$, 10 to 15 mole percent $Cu_2O$, and a member selected from the group consisting of $TiO_2$, CoO, NiO, $Fe_2O_3$ and $AlF_3$ and mixtures thereof; and a glass composition containing 74.5 to 88 mole percent $SiO_2$, 2.5 to 10 mole percent $Al_2O_3$, 7.5 to 12.5 mole percent $Cu_2O$ and at least one of 1 to 6 mole percent $TiO_2$, $Fe_2O_3$, NiO or CoO.

The glasses employed herein can be prepared by blending the necessary batch ingredients, melting and heating to a temperature such that all of the glass forming ingredients are present in a liquid state to enable the formation of a glass from a homogenous melt. The glasses are usually prepared by mixing and then melting in a 90% platinum–10% rhodium crucible or a fused silica crucible. The size of the melt was usually between 2000 grams and 5500 grams, or larger, and the melting temperature was about 1500° C. to 1600° C., for a time of about 20 to 30 hours. The melting was carried out in an electrically heated furnace, although other equivalent heating means could be successfully utilized.

The glasses used herein were prepared from commercially available reagents, for example, Kona Quintus Quartz, Alcoa A–14 Alumina, CuO, $Cu_2O$, $TiO_2$, NiO, $Fe_2O_3$, Hi Calumet Cupric and the like.

Glass compositions used for the purpose of the present invention include a glass with a theoretical oxide composition consisting essentially of 77.5 mole percent $SiO_2$, 10.0 mole percent $Al_2O_3$ and 12.5 mole percent $Cu_2O$, and possessing an unannealed density of 2.732 gm./c.c. and a coefficient of thermal expansion of $3.2 \times 10^{-7}$ in./in./° C. (0–300° C.). The immediate glass was prepared by intimately mixing 3745 grams of Kona Quintus Quartz, 822.8 grams of A–14 Alumina and 1493 grams of 96.3% cuprous oxide, and melting the mixed batch in a fused silica crucible at 2950° F. for about 24 hours under a 0.5% oxygen atmosphere. Other glass compositions were prepared as follows: a glass was prepared by melting a batch containing 3193 grams of Kona Quintus Quartz, 700 grams of A–14 Alumina, 1018 grams of $Cu_2O$ and 130.2 grams of NiO, for 24 hours and 40 minutes at 2950° F., to effect a glass having a theoretical composition of 77.5 mole percent $SiO_2$, 10.00 mole percent $Al_2O_3$, 10.0 mole percent $Cu_2O$ and 2.5 mole percent NiO; a glass prepared by intimately blending and melting, at 2920° F. for 24 hours and 30 minutes, a batch containing 3121 grams of Kona Quintus Quartz, 686 grams of A–14 Alumina and 1330 grams of Hi-Cupric Calumet to give a glass with the theoretical composition of 77.5 mole percent $SiO_2$, 10.0 mole percent $Al_2O_3$, and 12.5 mole percent $Cu_2O$, which glass had an unannealed density of 2.7020 gm./c.c., an annealing point of 601° C., and a coefficient of thermal expansion of $4.1 \times 10^{-7}$ in./in./° C. (0–300° C.); a glass consisting essentially of 75.0 mole percent $SiO_2$, 10.0 mole percent $Al_2O_3$, 12.5 mole percent $Cu_2O$ and 2.5 mole percent $Fe_2O_3$, was prepared from a batch containing 2922 grams of Kona Quintus Quartz, 622 grams of A–14 Alumina, 1204 grams of Cuprous oxide and 259.6 grams of $Fe_2O_3$ by melting said batch for 24 hours in a 0.5% oxygen atmosphere; a glass composition consisting of 73 mole percent $SiO_2$, 12.5 mole percent $Al_2O_3$, 12.5 mole percent $Cu_2O$ and 2.0 mole percent $TiO_2$ was prepared by intimately blending and then melting at 2950° F. for 24 hours in a 0.5% oxygen atmosphere a batch containing 2883 grams of Kona Quintus Quartz, 840 grams of A–14 Alumina, 1220 grams of $Cu_2O$ and 106 grams of Titanox ($TiO_2$); and a glass consisting of 77 mole percent $SiO_2$, 9.25 percent $Al_2O_3$, 12.4 mole percent $Cu_2O$, and 1.3 mole percent aluminum fluoride prepared from 3119 grams of Kona Quintus Quartz, 589 grams of A–14 Alumina, 1329 grams of Si-Calumet Cupric and 74 grams of Aluminum fluoride.

The oils that generally can be employed for the purpose of the instant invention are commercially available and are conveniently classified as petroleum, animal, marine and vegetable oils. The vegetable, animal and marine oils usually contain saturated fatty acids and unsaturated fatty acids. The saturated fatty acids series have the general formula $C_nH_{2n-1}COOH$. Exemplary of saturated fatty acids are the acids containing from 3 to 20 carbon atoms, usually from 10 to 20 carbon atoms. As examples of saturated fatty acids can be cited butyric, caproic, lauric, myristic, palmitic, stearic and arachidic. The unsaturated fatty acids have the general formula $C_nH_{2n-1}COOH$, $C_nH_{2n-3}COOH$ and $C_nH_{2n-5}COOH$. Examplary of unsaturated fatty acids are the acids containing from about 10 to 20 carbon atoms. As examples of unsaturated fatty acids can be cited oleic, palmitolic, linoleic, linolinic and the like.

As examples of oils can be cited corn oil with a fatty acid composition, expressed as percent by weight, of 0.1 myristic, 8.1 palmitic, 2.5 stearic, 1.2 palmitoleic, 30.1 oleic, 56.3 linoleic and saturated and unsaturated above $C_{18}$ of 1.7; cottonseed oil with a fatty acid composition expressed as percent by weight, of 1.4 myristic, 23.4 palmitic, 1.1 stearic, 1.3 arachidic, 2.0 palmitoleic, 22.9 oleic, 47.8 linolenic and 0.1 tetradeconoic; olive oil with a fatty acid composition, expressed as percent by weight, of 1.2 myristic, 15.6 palmitic, 2.0 stearic, 1.6 palmitoleic, 64.6 oleic and 15.0 linoleic; peanut oil with a fatty acid composition, expressed as percent by weight, of 0.5 myristic, 7.8 palmitic, 3.1 stearic, 2.4 arachidic, 1.7 palmitoleic, 54.3 oleic, 26.0 linoleic, 3.1 behenic and 1.1 lignoceric; safflower oil with a fatty acid composition of, expressed in weight percent, 0.4 lauric, 1.1 myristic, 2.9 palmitic, 1.1 stearic, 0.5 arachidic, 32.8 oleic, 61.1 linoleic and 0.1 linoleic and other like oils.

Exemplary of other oils are the petroleum oils such as light, medium and heavy lubricating oils of $C_{12}$ to $C_{26}$ carbons, the paraffin oils of $C_{10}$ to $C_{18}$ carbons, transformer oils, mineral oils, albolene, light machine oils and other like oils.

Generally, in attaining the objects, features and aspects of the present invention, the subject glass to be metalized is first heated to about 750° to 950° C., or to a temperature just below its distortion temperature. This latter temperature is also art-known as the deformation temperature, or the temperature at which the glass begins to deform under its own weight. After the heating step, the hot glass is dipped or submerged into an oil bath to effect a metal layer on at least one surface of the glass. The temperature of the oil bath is usually at 20° to 30° C., generally room temperature, although other temperatures lower than the temperature of the heated glass can be used. The glass per se acts as a source of the metal and the metal, as a constituent of the glass, remains tightly bound with the glass.

The following examples are representative of the mode and manner of performing the invention and are therefore illustrative, and are not to be considered as limiting the scope of the invention.

EXAMPLE 1

A metalized, electrically conductive copper surface was produced on a piece of glass, characterized by having a theoretical oxide composition of 77.5 mole percent $SiO_2$, 10.0 mole percent $Al_2O_3$ and 12.5 mole percent $Cu_2O$ by first heating said glass to about 750° C. The glass was heated in an electric furnace, but other sources of heat could also be used. After heating, the hot glass was immersed into a bath containing transformer oil. The copper layer produced demonstrated a low resistivity, about 0.4 ohms as measured between probes spaced about 1 inch apart.

EXAMPLE 2

The procedure used for Example 1 was employed for the present run, except that the furnace temperature in the present study was 850° C. The hot glass was plunged into the transformer bath and the process of manufacture produced an adherent, tightly bound copper surface.

EXAMPLE 3

Following the procedure as set forth in Examples 1 and 2, a piece of glass was heated to 950° C. and then immediately submerged into the transformer oil bath. The copper layer produced had a resistivity of about 0.4 ohms.

EXAMPLE 4

A piece of glass was heated in a furnace in the normal way to a temperature of about 750° C. The glass was allowed to remain in the furnace until the glass is uniformly heated throughout. Next, the glass which had a composition of 77.5 mole percent $SiO_2$, 10.0 mole percent $Al_2O_3$ and 12.5 mole percent $Cu_2O$, was immersed in a container filled with lubricating oil, about 30 S.A.E. number. These processes, acting upon the copper rich glass, produced a metallic copper layer in the glass surface. The metallic copper layer had a low resistivity, about 0.4 ohms as measured with a standard, commercially available ohm-meter.

EXAMPLE 5

The procedure utilized in Example 4 was repeated and all conditions and reaction procedures were as above described, except that the temperature of the furnace for the present run was 850° C. The copper layer produced at the present temperature also demonstrated low resistivity.

EXAMPLE 6

Following the procedure as set forth in Examples 4 and 5, a piece of glass was heated to 950° C., and then sunk into the lubricating oil. The resistivity of the adherent copper layer was about 0.4 ohms.

EXAMPLE 7

A piece of glass was heated in a furnace at a temperature of 950° C. and allowed to remain in the furnace until the glass was uniformly heated throughout. The glass, which had a theoretical oxide composition of 77.5 mole percent $SiO_2$, 10.0 mole percent $Al_2O_3$ and 12.5 mole percent $Cu_2O$, was then thrust into a cottonseed oil bath. The instant heating and bath treatment resulted in a uniform production on the glass of substantially pure copper.

EXAMPLE 8

A sample of copper-rich glass was processed as follows: a piece of ground and polished glass of approximately 1¼ inches square by 5/16 inches thick with a ⅛ inch center hole was heated at 950° C. until the heat was evenly distributed throughout the glass, and then it was submerged into cottonseed oil. On examination of the thusly treated glass, a copper coating was noted on all of the glass surfaces including the surface inside the hole. Next, wire leads were soldered to opposite sides of the glass and the measured resistance was about 0.4 ohm. Finally, a metal template was placed in the glass surface and the template having an openwork design therein was sandblasted with a commercially available sandblasting unit. The template design was impressed on the glass surface by the removal of the copper conductive layer in the non-protected, openwork areas.

The articles produced by the novel process of the present invention can be used in the fields of science and commerce. For example, the process provides a metalized or electrically conductive surface for employment in the electronic arts, such as printed circuits on a glass substrate and wherever conductive surfaces are employed. The glasses produced by the present invention can also be used to decorate other commercial glass, or glass-ceramics, by joining the copper glass to the former glasses and then effecting designs or words on the processed copper surface by selective treatment with the use of templates or with the novel process.

What is claimed is:

1. A method for converting the surface of a glass body in situ to an electrically conductive surface comprising the steps of
    selecting a glass body having a glass composition consisting essentially of 50 to 94 mole percent $SiO_2$, 0.5 to 30 mole percent $Al_2O_3$, 1.5 to 35 mole percent $Cu_2O$, 0 to 11 mole percent $TiO_2$, 0 to 6 mole percent $Fe_2O_3$, 0 to 6 mole percent NiO, 0 to 6 mole percent CoO and 0 to 6 percent $AlF_3$;
    heating said glass body to a surface temperature in the temperature range of between its annealing and deformation temperatures;
    converting said surface of said glass body to an electrically conductive surface by disposing said heated glass body in a substantially lower temperature bath of oil composed essentially of at least one oil selected from the group consisting of petroleum oil, animal oil, marine oil and vegetable oil, said bath of oil thereby converting at least some of said metal oxides in said surface in situ into their corresponding elemental metals, and thereby converting said surface of said glass body to an electrically conductive surface.

2. A method, as defined in claim 1, wherein said bath of oil is composed essentially of vegetable oil.

3. A method according to claim 2 wherein said vegetable oil contains saturated fatty acids having 3 to 20 carbon atoms and unsaturated fatty acids having 10 to 20 carbon atoms.

4. A method according to claim 1 wherein said oil is cottonseed oil.

5. A method according to claim 1 wherein said oil is corn oil.

6. A method according to claim 1 wherein said oil is olive oil.

7. A method according to claim 1 wherein said oil is peanut oil.

8. A method according to claim 1 wherein said oil is safflower oil.

9. A method according to claim 1 wherein said glass consists essentially of 58 to 83 mole percent $SiO_2$, 4 to 20 mole percent $Al_2O_3$, 10 to 20 mole percent $Cu_2O$ and 0 to 6 mole percent $AlF_3$.

10. A method according to claim 9 wherein said glass consists essentially of 77.5 mole percent $SiO_2$, 10.0 mole percent $Al_2O_3$ and 12.5 mole percent $Cu_2O$.

11. A method according to claim 9 wherein said glass consists essentially of 77 mole percent $SiO_2$, 9.25 mole percent $Al_2O_3$, 12.4 mole percent $Cu_2O$ and 1.3 mole percent $AlF_3$.

12. A method according to claim 9 wherein said glass contains 10 to 15 mole percent $Cu_2O$ and 1 to 6 mole percent $AlF_3$.

13. A method according to claim 1 where said glass consists essentially of 58 to 83 mole percent $SiO_2$, 4 to 20 mole percent $Al_2O_3$ and 10 to 20 mole percent $Cu_2O$.

References Cited

UNITED STATES PATENTS

| 3,231,456 | 1/1966 | McMillan et al. | 65—33 XR |
| 3,271,207 | 9/1966 | Davis | 65—116 |

S. LEON BASHORE, Primary Examiner

J. H. HARMAN, Assistant Examiner

U.S. Cl. X.R.

65—32, 60; 117—124, 229